July 11, 1972 R. B. BUONAIUTO 3,676,033
APPARATUS FOR MAKING THERMOPLASTIC CELLULAR PRODUCTS
Original Filed April 30, 1968 2 Sheets-Sheet 1
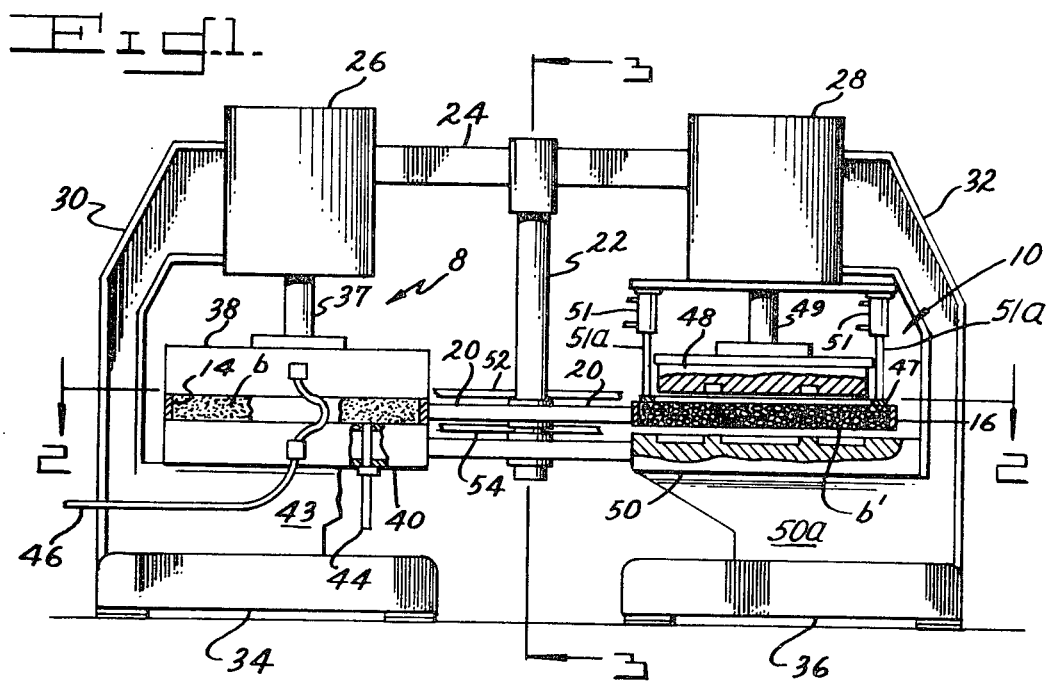
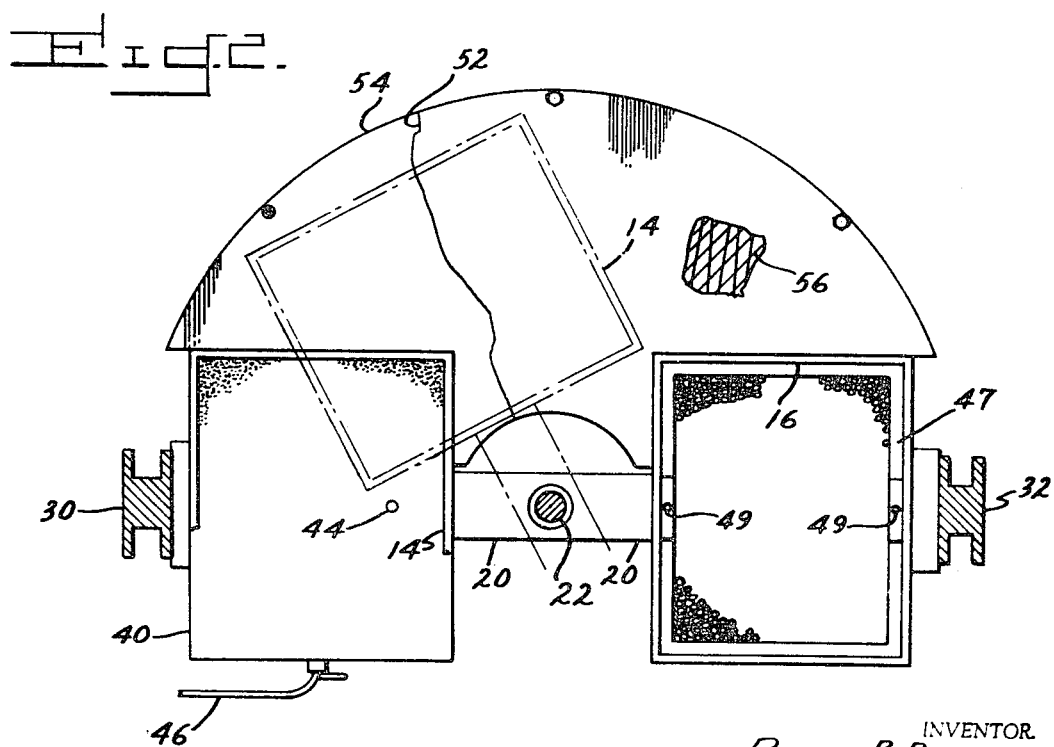
INVENTOR
ROBERT B. BUONAIUTO
BY Chapin, Neal & Dempsey
Attorneys July 11, 1972   R. B. BUONAIUTO   3,676,033
APPARATUS FOR MAKING THERMOPLASTIC CELLULAR PRODUCTS
Original Filed April 30, 1968   2 Sheets-Sheet 2
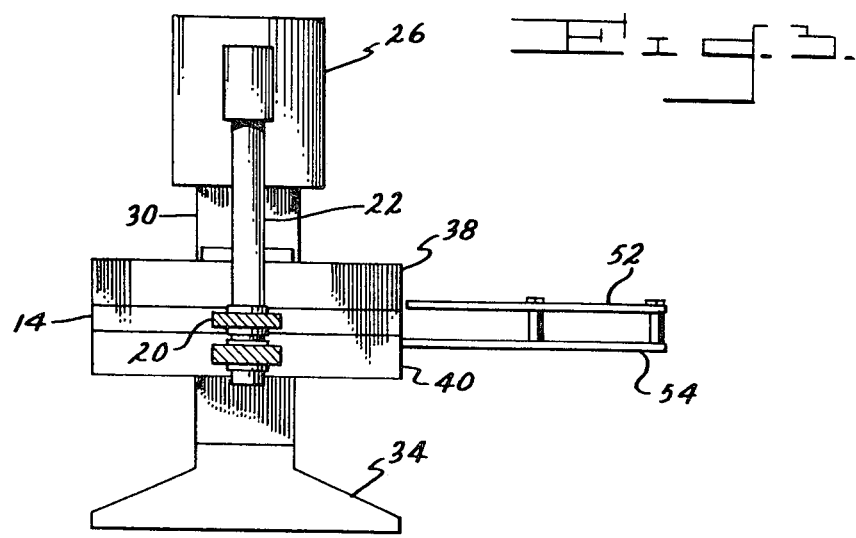
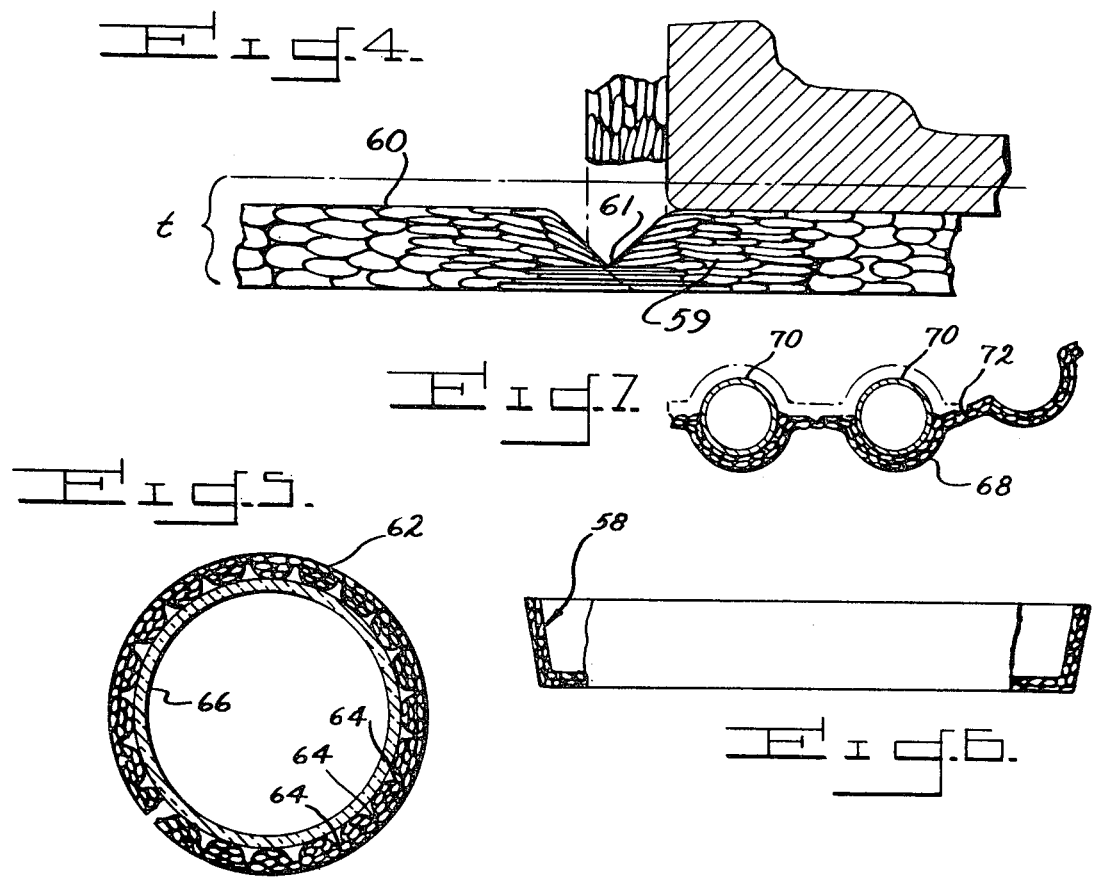
INVENTOR.
ROBERT B. BUONAIUTO
BY Chapin, Neal & Dempsey
Attorneys

United States Patent Office 3,676,033
Patented July 11, 1972

3,676,033
APPARATUS FOR MAKING THERMOPLASTIC CELLULAR PRODUCTS
Robert B. Buonaiuto, 12 Bayview Road, Ipswich, Mass. 01938
Original application Apr. 30, 1968, Ser. No. 725,430 Divided and this application Apr. 16, 1971, Ser. No. 134,708
Int. Cl. B29c *3/04;* B29d *27/00;* B29g *7/02*
U.S. Cl. 425—174          7 Claims

ABSTRACT OF THE DISCLOSURE

An apparatus for making thermoplastic cellular plastic products and which has preform and final forming stations. The apparatus features the use of a pair of frames which are interchanged at the said preform and final form stations by a transfer mechanism. Each frame is charged with thermoplastic beads while held between platens at the preform station for the introduction of heat to form a cellular preform blank and is then moved to the final form station where the blank is given a final shape between another pair of platens.

CROSS-REFERENCE TO RELATED APPLICATION

This application is a division of application Ser. No. 725,430, filed Apr. 30, 1968, on "Method of Making Thermoplastic Products and the Cellular Products Made Thereby," which application is now abandoned.

BACKGROUND OF THE INVENTION

In recent years plastic foam packing has gained increasing importance in the packaging industry. Thermoplastic resin, such as polystyrene when in cellular form, has much to recommend it as a packaging material, since it is characterized by its excellent shock resistance which serves to cushion any products packaged therein. In addition, the material is of relatively low cost, moistureproof and heat resistant. This material is used in many different ways, including foam extrusions or strips used in the manner of confetti, packaging inserts and containers molded for protection of fragile products.

Usually packaging containers of cellular thermoplastic are formed by the well-known molding technique of charging a mold cavity with partially expanded resin beads. Heat, usually in the form of steam, is then applied to the beads in the porous mold to raise the beads to about the softening temperature of the polymer and above the boiling point of the organic fluid contained in the beads. The steam causes the heated resin granules to expand and fuse into a homogeneous cellular mass. Following the heating step it is necessary that the cellular foamed article be cooled while still contained in the mold cavity to prevent further expansion or distortion of the article, such as would occur if the article were removed from the mold prior to cooling. Once the mold is cooled it must be heated again at the start of the next mold cycle.

It is the general object of this invention to provide an improvement on the known methods by incorporating apparatus which will make a more desirable thermoplastic product more efficiently and in less production time and more economically than prior apparatus performing the known method or methods mentioned.

DESCRIPTION OF THE DRAWINGS

FIG. 1 is an elevational view of one type of apparatus for use in carrying out my invention;
FIG. 2 is a section taken along lines 2—2 of FIG. 1;
FIG. 3 is a section taken along line 3—3 of FIG. 1;
FIG. 4 is a partial sectional view showing an illustrative packaging panel with fold line made in accordance with my invention;
FIG. 5 is a view similar to FIG. 4 showing another form of packaging panel;
FIG. 6 shows one form of packaging container made in accordance with my invention; and
FIG. 7 shows another form of packaging container made in accordance with my invention.

DESCRIPTION OF THE PREFERRED EMBODIMENT

Referring in detail to the drawings, in FIG. 1 is shown apparatus embodying this invention. In general, the apparatus comprises two separate operating stations 8 and 10. The first station 8 comprises means for fabricating or preforming foam blanks *b*, and the second station includes means for shaping or forming the blanks into a desired final configuration. Movable between one and the other of the two operative stations are mold defining frame members 14 and 16. Each of these members is identical in construction, and may be moved in any suitable manner from the foaming station 8 to the forming station 10. In the embodiment shown, the frame members comprise upright walls arranged as an open frame and supported by arms 20 radially extending from a shaft 22 for movement between one and the other of the two stations. However, the said frames need not be open at both the top and bottom as shown.

The shaft 22 may be driven by any suitable means and is suported by the framework of the apparatus on a crosshead 24 which extends between fluid motor cylinders 26 and 28 which are supported by upright stanchions 30 and 32, extending upwardly from base members 34 and 36 as a part of the apparatus framework. A vertically reciprocably movable steam header or platen 38 is appropriately affixed to the end of the piston rod 37 extending from the cylinder or fluid motor 26. A second steam header or platen 40 is rigidly mounted on a bench 43 which forms part of the framework. The platen 40 is directly below the platen 38 and its upper surface is disposed approximately coplanar with the lower edges of the mold defining frame at the blank or preforming station 8. A conduit 44 extends through the platen or steam header 40 for charging with thermoplastic beads the cavity defined by the frame at the blank or preforming station 8 (in the drawing, the frame 14) and the opposed upper and lower surfaces of the two platens 40 and 38. The beads may be partially pre-expanded as are commonly used in conventional molding techniques, or they may be "raw" or unexpanded beads, particularly where the blank is to be a relatively thin block of foam. Any suitable means may be provided for causing expansion and fusion of the bead particles to fill the preform mold cavity at the station 8 and in the embodiment shown a steam line 46 is connected to both the upper and lower headers 38 and 40 which are appropriately cored to uniformly disperse steam through the body of beads *b* within the frame 14. The surface of the platens may either be uniformly perforated or formed of a porous material so that steam will fully permeate the body of beads contained within the cavity formed between the opposed surfaces of the steam headers and the bead frame.

Means for final thermoforming of the preformed foam blank is provided at the forming station 10 and may include vacuum or pressure forming or a combination thereof, also an inflatable bag may be used to give a desired contour and of course dies may be used.

In the embodiment shown, a reciprocably movable die member 48 is affixed to piston rod 49 extending from the fluid motor cylinder 28, and a complementary die 50 is rigidly supported directly below die 50 by a bench 50a which extends from the base 36. As shown, the die 48 is the male die, and die 50 is the female die. The die 48 is moved toward and away from the die 50 by the fluid motor to shape or form a blank of cellular plastic material, such as shown at b' in FIG. 1. A clamping frame 47 is supported on vertically reciprocable piston rods 51a above the outer peripheral edge of the foam blank. The frame 47 fits closely within either of the frames 14 and 16 at the station 10 and is movable with the piston rods 51a extending from fluid motors 51 toward and away from the supporting die 50 so as to selectively clamp and hold the edges of the blank during final forming. In this way the blank may be thermoformed into any desired final shape. The frame 47 is retracted to permit the bead frame 14 or 16 to be swung away from the forming station 10 back to the blank fabricating station 8.

Extending between the two operating stations, means such as spaced parallel plates 52 and 54 or a series of closely spaced rollers (not shown) are provided for preventing distortion or excessive expansion of the foam blank b. See also FIGS. 2 and 3. The plates extend over the arc of travel of the rectangular frames from closely adjacent the station 8 to a position adjacent station 10. The plates are spaced apart a distance slightly greater than the height of the walls of the rectangular frames 14 and 16. Preferably, some suitable means, such as electrical heaters 56, are provided so that the opposed inner surfaces of the plates will be sufficiently heated to maintain the block of foam b at the proper temperature for final forming in the die press. Of course, it will be realized that under certain conditions and cycle times the foam blank may remain sufficiently hot for forming without the necessity of supplying additional heat, such as by the use of heating coils 56.

In operation, with one of the bead frames 14 disposed between the steam header or platen 38 and the platen 40, beads are supplied through the conduit 44 to charge the cavity within the frame 14. Thereafter the beads are heated by some suitable means, such as by supplying steam through the steam line 46 to permeate the beads within the cavity. The heating is carried out at a sufficiently high temperature so that the beads expand and fuse to form a cavity filling integral blank of cellular thermoplastic beads or foam. The time for fusing the blank depends upon the thickness of the blank being formed. It has been found that approximately 5–25 seconds will normally suffice for blanks ¼" to 2" thick.

After foaming or preforming, the frame 14 is swung between the spaced parallel plates 52 and 54 to the forming station 10. If necessary or desirable, the inner surfaces of the plates may be coated or finished to reduce drag or sticking of the hot foam blanks. A material, such as "Teflon," may be used for this purpose. During its transit from station 8 to station 10 the foam blank is prevented from further expansion by the plates 52 and 54 and is also kept in a hot condition by the heaters 56 until located at the forming station 10. By actuation of the fluid motors 51, at the forming station, the hot, pliable blank is clamped by a clamping frame 47. The forming die 48 is then thrust downwardly by fluid motor 28 so as to compress the blank between the dies 48 and 50 while it is still hot and pliable.

In this way, the foam beads making up the blank are compressed or flattened from their original generally spherical configuration. The foam product is thus characterized by compressed cells, flattened or elongated in a direction parallel to the top and bottom surfaces of foamed articles, as shown at 59 in FIG. 4. It has been found that this somewhat laminar or plate-like cross-section of the resin cells results in a product having a resilience and flexibility substantially greater than in foam products made by the known molding methods. Variously shaped foam articles are thus formed into a desired final configuration, such as shown in FIGS. 4–7.

After the forming operation, the movable die 48 and clamping frame 47 are retracted clear of the frame 14, and the frame is swung from the forming station so that the completed article may be deposited on a suitable conveyor, not shown.

Using this invention, it has also been found that packaging trays can be formed without any die 48 by using a simple frame for holding the articles to be packaged. The frame, carrying the articles to be packaged, may be substituted for the forming die 48, and when the articles are pressed into the hot foam blank, they form precisely accommodating recesses in the blank so that upon cooling, a package entity of foam with product embedded therein is provided. No further assembly is required.

During operation of the die 48 at the forming station, the other bead frame, in this case frame 16, is charged at the first station 8 with thermoplastic beads, and the beads fused by steam and the blank preformed in the manner previously described. It will thus be noted that there are two separate and distinct stations, one is for the heating and preforming portion of the thermal cycle and may be kept hot at all times, and the other is for the final forming part of the cycle and may be kept cool at all times. This obviates the necessity of cycling the apparatus from hot to cold as is necessary in conventional molding. Since the bead frames are of light-weight, openwork construction they readily adapt to both the heating and final forming operations without the need for substantial time delay, as is encountered with massive mold configurations usually employed in forming foam articles.

After the article is formed and allowed to cool, the platens at the forming station 10 are opened and the article just formed is extracted while the frame is in transit back to the blank forming station. Cooling of the formed article usually occurs naturally within the time to fabricate another foam blank at the preform heating station 8. If necessary or desirable, however, cooling coils may also be used in the forming dies 48 and 50 to speed up the cooling process.

By reference to FIG. 4 a cross section is shown of a portion of an article 60 made in accordance with the method embodying this invention and employing equipment of the type shown. It has been found that the density of the foam is substantially greater than usually encountered in conventional molding, and the blank from which the article was formed may have had a substantially greater thickness $t$ than that of the finished product. Moreover, the density may be controlled during the forming process by compressing the blank to the desired final wall thickness. This is not accomplished in conventional molding where the density is essentially limited to the density of the starting material.

Moreover, as previously discussed, the compressed, plate-like cell formations resulting in articles made by the process of this invention are softer and more resilient, flexible and shock absorbing than in conventional foam articles. In addition, since the density of the article and its configuration can be controlled selectively, hinge lines or fold lines may be formed in the article, such as shown at 61 in FIG. 4. In this figure it will be appreciated that hinge line 61 which was formed from a blank having the initial thickness $t$ was reduced substantially in thickness at the hinge line thereby greatly increasing the density of the foam in this area. As a result it has been found that the beads are flattened into a laminar structure whereby the foam articles may be folded a great many times along the hinge line without rupture. This, of course, cannot be done with the conventionally molded rigid thermoplastic foam.

Moreover, the packing material can be readily formed by this process in a flat condition, such as shown in FIG. 4, and then folded along hinge lines, such as shown at 61 to form suitable packaging containers or boxes. It will, of course, be appreciated that such packaging containers or boxes can be stored and shipped in a flat condition at great saving and space, and when ready for use can then be assembled and folded along the hinge line and secured by any appropriate means, such as suitable pressure sensitive tape or the like.

An added feature of this invention is in providing a suitable wrap-around packaging material, such as shown at 62 in FIG. 5. This packaging material is provided with a series of spaced parallel hinge lines 64. As a result, the material has a series of ridges and grooves which permit the material to be placed around a curved article, such as shown at 66 in FIG. 5.

In addition, relatively thin walled packaging material can also be made by the process and apparatus embodying this invention, one such material, as shown at 68, in FIG. 7, housing some such fragile article as a radio tube or the like, as shown at 70. The sheet 68 may be provided with a hinge line 72 so that a unitary sheet can be easily formed and readily folded to form the top and bottom of a package. This material is well suited for the protection of relatively large diameter articles and is made by substantially compressing and stretching a flat blank into the final sheet form with recesses dimensioned to accommodate articles for which the sheet is to be used. Of course, a packaging blank could also be formed by just compressing recesses in a foam blank using either a suitable die arrangement or the article itself to form the recesses as previously mentioned.

Among the advantages of this invention is that the equipment is relatively inexpensive when compared with conventional metallic molds generally used for forming such foamed articles. Indeed, in certain instances this invention makes it feasible to avoid entirely the use of forming dies and molds. Moreover, the bead frames may be made of any light-weight material, including suitable metal-plastic combinations, such as reinforced epoxy or polyester resins. In addition, the density of the foam may be controlled for any given article and may even be such as to provide for density distribution within any article, whereby any hinge or fold line may be provided, as previously described. Furthermore, the foam itself has a softer, more shock absorbing quality which is so desirable in a packaging material. The reason for the enhanced resilience of this material, while not fully understood, seems to be based on the softening or rupture of the primary wall of the individual spherical cells which are ordinarily quite rigid. When deformed, however, the cells, although somewhat flattened, are thereafter quite resilient and elastic in nature. In this invention, the compression or flattening of the beads is carried out while the foam blank is still hot and pliable and results in a foam having unique properties.

I claim:

1. An apparatus for making thermoplastic cellular products including a preforming station and a final forming station, a plurality of frames and at least one frame movable between said stations, relatively movable elements permanently located at said preforming station including relatively movable mold elements adapted to move toward each other, a cavity within each frame and means to charge said cavity with thermoplastic expandable beads and means to apply heat to the beads thereby to form a fused cellular blank in said frame in the preform shape of the cavity, the relatively movable elements then being movable away from each other, a transfer mechanism for moving said frame and the preformed blank from the preform station to the final forming station, and the blank retaining its heat, and relatively movable mold elements permanently located at said final forming station adapted to engage and compress a blank held by a frame to provide the desired final product form.

2. The apparatus set forth in claim 1 wherein said frame is open at the top and bottom, said relatively movable elements at the preforming station comprise heated mold elements adapted to close said frame and define the cavity, and wherein said relatively movable elements at the final forming station include a male die member adapted to engage the blank within said frame to compress at least a portion of the blank into the final desired shape of the product.

3. The apparatus of claim 2 including a clamping mechanism at said final forming station adapted to engage and retain said blank within said frame while the associated relatively movable elements are operated to engage the blank.

4. The apparatus set forth in claim 2 wherein parallel plate surfaces are provided to extend substantially between said stations so that the frame will pass therebetween in movement from the preforming station to the final forming station, the said plates thereby limiting expansion of said blank in the frame during movement between stations.

5. The apparatus of claim 4 wherein additional heating means is provided in said plates to maintain the heated condition of the blank during movement between stations.

6. Apparatus according to claim 2 wherein a pair of frames are provided and are mounted for movement so that one frame will be at each station at the same time and each frame is moved in sequence from station to station.

7. Apparatus as defined in claim 6 wherein the said frames are located at the respective ends of an arm which is rotated on an axis at its midpoint.

References Cited

UNITED STATES PATENTS

| 809,901 | 1/1906 | Blake et al. | 425—452 X |
|---|---|---|---|
| 1,336,579 | 4/1920 | Oxley | 425—413 X |
| 2,003,702 | 6/1935 | Straub | 425—253 |
| 3,407,443 | 10/1968 | Beebee et al. | 18—4 P |
| 3,193,874 | 7/1965 | Jablonski | 18—4 P |
| 2,333,059 | 10/1943 | Tucker | 18—20 HX |
| 3,054,141 | 9/1962 | Hammesfahr | 18—4 PX |
| 3,129,464 | 4/1964 | Heider | 18—5 PX |
| 3,342,913 | 9/1967 | Engel | 18—5 PX |
| 3,374,500 | 3/1968 | Drenning | 18—5 P |

FOREIGN PATENTS

| 1,495,851 | 10/1966 | France | 18—5 P |
|---|---|---|---|
| 85,800 | 6/1958 | Denmark | 18—4 P |

ROBERT L. SPICER, JR., Primary Examiner

U.S. Cl. X.R.

425—253, 413, 450, 452